United States Patent

[11] 3,609,365

| [72] | Inventors | Frank R. Malinowski;<br>James S. Lee, both of Santa Barbara, Calif. |
|---|---|---|
| [21] | Appl. No. | 665,025 |
| [22] | Filed | Sept. 1, 1967 |
| [45] | Patented | Sept. 28, 1971 |
| [73] | Assignee | Santa Barbara Research Center<br>Goleta, Calif. |

[54] RADIOMETER ARRANGEMENT AND CONTROL CIRCUIT THEREFOR
9 Claims, 4 Drawing Figs.

[52] U.S. Cl. .................................................... 250/83.3
[51] Int. Cl. ...................................................... G01t 1/16
[50] Field of Search ........................................... 250/83.3
IR, 83 C, 203

[56] References Cited
UNITED STATES PATENTS
3,167,714  1/1965  Seling ............................ 250/83.3 X
3,311,747  3/1967  Smith, Jr. et al. ............... 250/83.3
3,350,562  10/1967  Flint ............................. 250/83.3

*Primary Examiner*—Ralph G. Nilson
*Assistant Examiner*—Davis L. Willis
*Attorneys*—James K. Haskell and Bernard P. Drachlis ABSTRACT: The invention is directed to a radiometer arrangement which may be utilized to periodically scan a source of electromagnetic radiation and provide an electrical output signal accurately related to the radiation emanating from the source. A control circuit is provided to synchronize the transmission of radiation information with the rotary action of the arrangement during successive scans. A DC signal amplifier is employed and means are provided to restore the amplifier to a base level periodically, thus eliminating false information that could be generated within the system by amplifier drift.

PATENTED SEP 28 1971 3,609,365

Frank R. Malinowski,
James S. Lee,
INVENTORS.

BY

*Neil J. Driscoll*

ATTORNEY.

RADIOMETER ARRANGEMENT AND CONTROL CIRCUIT THEREFOR

The invention relates to a radiometer arrangement and control circuit having particular utility in space applications.

Prior art radiometers, especially those using bolometers in a detection function, have not been capable of utilizing the full detectivity level of the structure's capability. This was due to the fact that a radiation chopper was employed in the optical system to interrupt the received radiation and permit the detector signal to be coupled to an AC amplifier for signal reading and recording. The necessity of chopping was directly related to the need for employing an AC amplifier in view of the fact that DC coupled amplifiers exhibit long term drift characteristics which impair their operating accuracy.

The present invention teaches the application of a DC amplifier in a controlled scanning operation, wherein the radiometer, at certain appropriate periods, views a relatively stable low radiation level existent in dark space and thus sets the appropriate conditions for sequential restoring of the DC amplifier to a predetermined base condition prior to the passage of received radiation signals from the detecting device.

Specifically, the invention is adapted to satellite-borne radiometers which may be placed in orbit about an appropriate planet and are arranged to rotate about an appropriate axis, and, during that period of rotation, sequentially line-scan the orbited planet and thereafter view the radiation stable condition of dark space. The structure and arrangement thus contrived demonstrates an increased efficiency, i.e., detectivity level, of approximately a factor of four.

These and other specific features and advantages of the invention will become more apparent in the course of the following description and from an examination of the related drawings, wherein.

Figure 1:
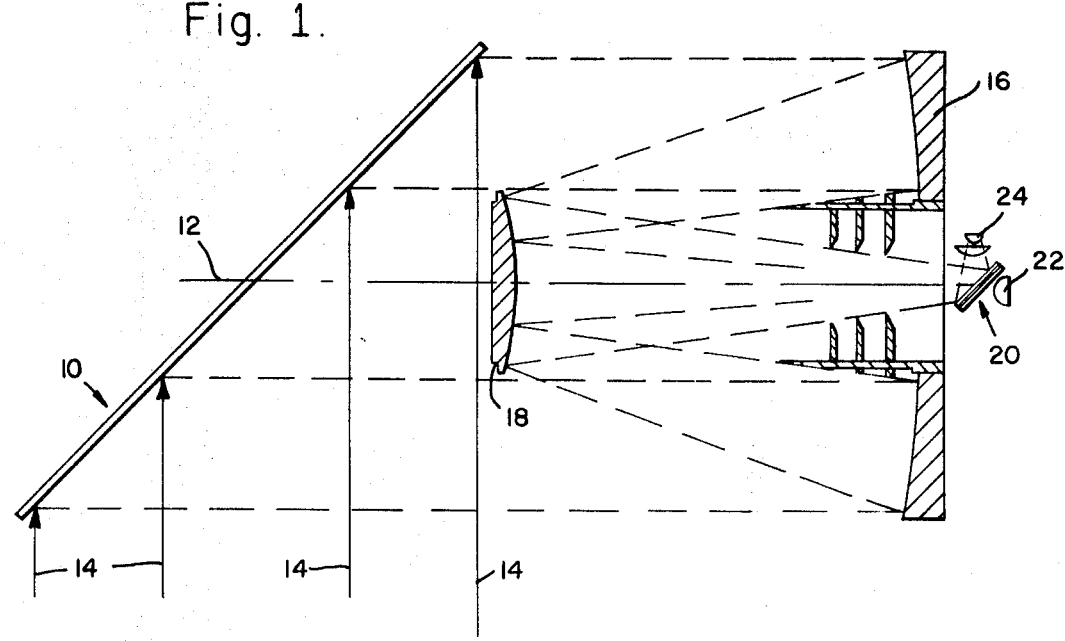
FIG. 1 is a schematic side-elevational view of an optical arrangement utilizing a multichannel radiometer.

Describing the invention in detail and directing attention to the drawings, the schematic of FIG. 1 is illustrative of a typical Casssegrainian optical arrangement which may be used in an appropriate satellite-borne radiometer. A primary field of view is provided by the scan mirror, illustrated generally at 10, which, in its normal operative environment, is continuously rotating about the longitudinal axis 12 of the arrangement. The scan mirror thus provides a field of view generally coextensive with the arrows 14, 14. Received radiation is reflected by the scan mirror 10 towards a primary reflecting arrangement 16, the latter being concentrically arranged about axis 12. A secondary folding mirror 18 receives reflected radiation from mirror 16 and in turn concentrates the radiation on a dichroic beam splitter and filter arrangement indicated at 20. A pair of bolometer detectors indicated at 22 and 24 are provided in optical focus relation with the beam splitter and filter arrangement 20.

While the structure illustrated is generally adaptive to radiation detection over a broad spectral band, for illustrative purposes, the invention will be described with reference to certain particular radiation channels. For example, detector 22 may employ a germanium immersion lens with an immersed bolometer and thus be sensitive to radiation within the 10.5 to 12.5 micron range when an appropriate optical band-pass filter is used. Alternately, detector 24 may employ an unimmersed bolometer and thus be sensitive to radiation in the 0.5 to 0.75 micron range when an appropriate optical band-pass filter is used.

In operation, and as noted, the rotating scan mirror 10 and reflecting optical surfaces 16 and 18 concentrate received radiation at the dichroic beam splitter and filter arrangement 20. As is well understood in the art, the beam splitter and filter arrangement directs radiation in the appropriate spectral band to the first detector 22, while other radiation existent in the appropriate spectral band is directed to detector 24. It will also be readily apparent that, and assuming the radiometer is in orbital condition in a satellite, the mirror 10 will scan the orbited planet only during a certain arc of its rotation. During the balance of the rotation arc the mirror will be directed away from the orbited planet scanning either dark space or appropriate adjacent segments of the carrying craft and/or the radiometer housing.

Figure 2:
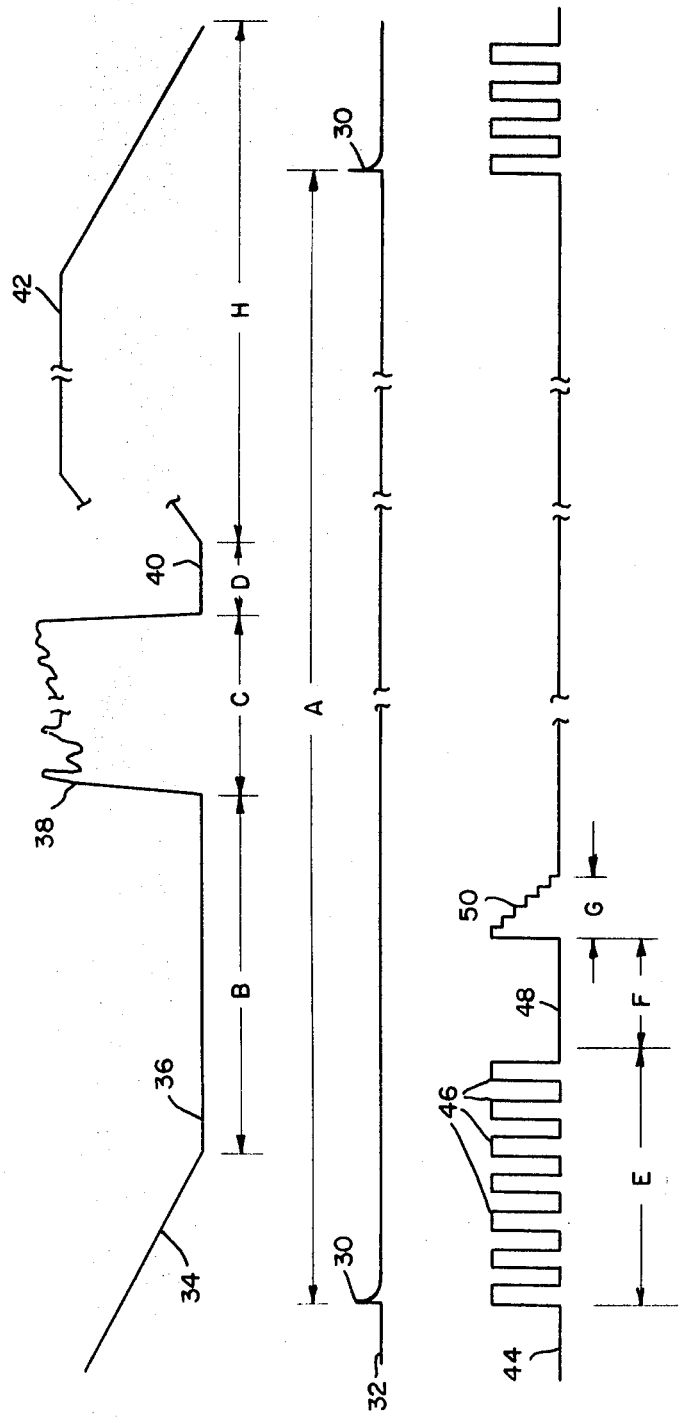
FIG. 2 is a relative sequence drawing illustrating the general operation of the scanning radiometer.
Figure 3:
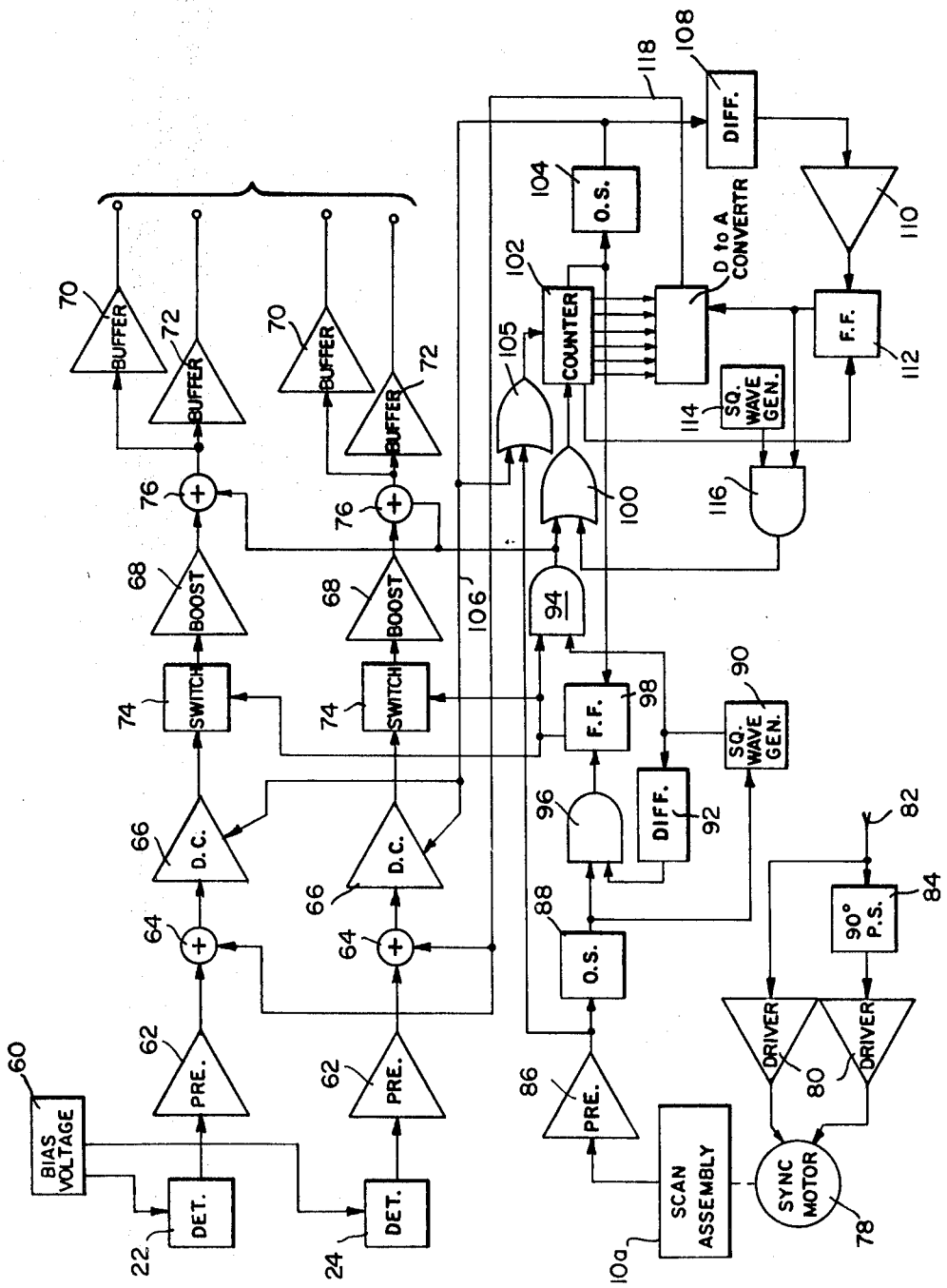
FIG. 3 is an electrical block diagram illustrating the operation of the radiometer arrangement.

Considering now FIGS. 2 and 3, the particular operation of the described arrangement will now be more fully explained. Initially, it will be understood that the rotational sequence hereinafter described may be conventionally triggered by a mechanical or magnetic position pip which is engaged at a particular point by and during each cycle of mirror rotation. With this in mind and directing attention to FIG. 2, the operational sequence may be initiated by an electrical pulse as shown at 30 on line 32. It will thus be apparent that the distance A between pulses 30, 30 represents the total 360° radiometer scanning period, the time of which will depend upon the rotational velocity of the scanning mirror.

Line 34 graphically illustrates the received radiation at the radiometer detectors relative to the particular view of the scanning mirror during its rotational movement. For example, a relatively level period of received radiation occurs at 36 and is indicated by the distance B when the mirror is viewing dark space. The abrupt increase and varying intensity of the received radiation, as indicated at 38, and the distance C reflects the received radiation as the mirror is scanning the orbited planet. At 40 the planet scan is completed and the received radiation returns to a low level indicated by the distance D as the mirror begins a short dark space scan period immediately after planet scan. The radiation level indicated by the line 42 evidences a possible radiation pattern as a result of mirror scan of adjacent segments of the carrying vehicle and/or radiometric check-of-calibration surface located on the unit.

As noted above, it is a primary purpose of the arrangement to provide a scan operation logic for control and transmission of scanned information to receiving stations. In effect, a sequence of intelligence generation, DC restoration and calibration is required for each 360° rotation of the scan mirror.

The pulse 30, as shown in FIG. 2, triggers a determined sequence of square wave electrical pulses 46 as shown on line 44. The square wave pulses are generated during distance period E. The square wave pulse train is used to synchronize successive line scans. Thereafter, the pulses 46 are halted and an amplifier restoring period indicated by the distance F and numeral 48 is accomplished. The electrical pulses shown at 50 represent a radiometer gain (voltage) calibration period and occurs during the period G on line 44. It will thus be apparent that the restoring and calibration periods occur sequentially in time during time period B, numeral 36, when the mirror 10 is viewing dark space and at a low steady radiation-receiving level.

The block diagram of FIG. 3 is illustrative of a preferred embodiment of the arrangement control circuit. The detectors, preferably bolometers, are shown at 22 and 24 and represent the detectors shown in FIG. 1. A bolometer bias supply 60 is provided to conventionally provide electrical current to the detectors 22 and 24, the resistance of which varies in relation to received radiation. The output signal coming from each bolometer reference is directed to an initial preamplifier 62, 62. In line sequence thereafter, each bolometer has in its circuit a calibration summing device 64, 64, a restoring amplifier arrangement 66, 66, and a high-frequency boosting amplifier 68, 68. Buffer amplifiers 70 and 72 are provided in each detector circuit to offer outputs to the transmitting device. Shorting switches 74, 74 and summing device 76, 76 are also provided, the purpose of which will be hereinafter explained.

A synchronous motor is indicated at 78 having input drivers 80, 80. In a typical application the motor 78 may be a two-phase synchronous motor with power input to the driver 80 occurring at source 82. A phase shifting device 84 may be provided to one driver 80. The motor 78, of course, drives scan mirror 10, here shown by scanning block 10A. As the mirror 10 passes the mentioned position magnetic generating pip, a position sync pulse is generated to preamplifier 86. The signal from preamplifier 86 triggers a 12 millisecond one-shot pulse from oscillator 88, which synchronizes a square wave oscillator 90 having an output with a 12 millisecond period. The output of oscillator 90 passes through differentiator 92 and to the "AND" gate 94. A second AND gate 96 receives the output of differentiator 92 as well as the output of oscillator 88. AND gate 96 in turn triggers a flip-flop switch 98. The setting of switch 98 opens shorting switches 74, 74 which breaks the circuit between the detectors 22 and 24 and their related output buffer amplifiers 70 and 72. The setting at switch 98 also provides an output to the AND gate 94 which allows the output of oscillator 90 to pass through OR gate 100 into counter 102. Counter 102 thus begins an 8 count cycle hereinafter described. Additionally, the outputs of square wave oscillator 90 (after passing through AND gate 94) are summed via devices 76, 76 into the inputs of the buffer amplifiers 70 and 72. The effect is to produce 6 millisecond square wave pulses with 6 millisecond spacings which indicates that a determined and amplified signal pattern reflecting the radiation received at detectors 22 and 24 is available for output to the transmitters as will hereinafter be described. In effect, this is a "stand ready" signal to a remote receiver.

After seven square wave output pulses from oscillator 90, flip-flop switch 98 is reset at the beginning of the eighth pulse which closes shorting switches 74 and breaks the circuit to summing device 76. Intelligence transmission reflecting received radiation can then begin.

The beginning of the 8 count on counter 102 fires a 25 millisecond one-shot pulse from oscillator 104. It is this pulse which resets the counter 102 (via OR gate 105) and gives a restore command via line 106 to the amplifier arrangements 66, 66 for a 25 millisecond period.

It was earlier noted that an important feature of the invention is to utilize a DC amplifier in operative association with the detectors rather than providing mechanical chopping devices cooperating with AC amplifiers. Amplification of the detector signal, of course, is necessary to provide a usable processing signal.

It was also noted that the invention reduces the effect of DC amplifier drift by periodic restoration thereof to an approximate base condition.

Figure 4:
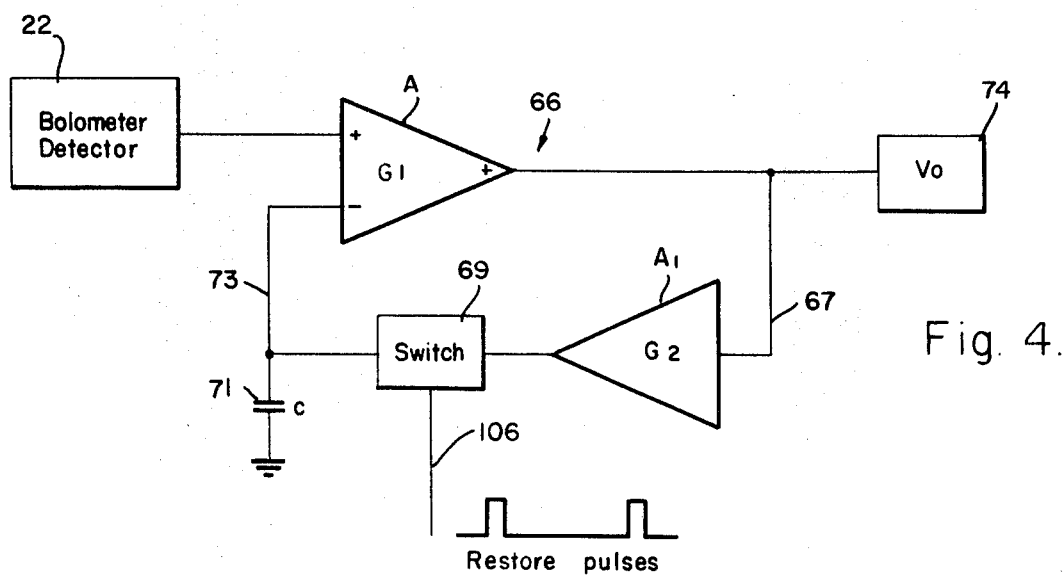
FIG. 4 is a detailed circuit of a typical restoring amplifier arrangement that may be employed.

Directing attention to FIG. 4, each amplifier arrangement is indicated generally at 66 to correspond to FIG. 3. A detector is shown at 22.

Each arrangement 66 comprises a primary differential amplifier A which provides detector signal gain. A restoring loop consists of line 67, a noninverting amplifier $A_1$, a switch 69, and capacitor 71 connected via line 73 to amplifier A.

The restoring pulse via line 106 closes switch 69 and the drift voltage existing in amplifier A charges capacitor 71 to a level approximately compensating for said drift voltage. This occurs, of course, during time period B, FIG. 2.

The restore pulse via line 106 terminates with the elapse of a determined time interval. Switch 69 then opens and the charge in capacitor 71 maintains the output of amplifier A to approximately zero.

The charge on capacitor 71 remains nearly constant during the elapsed time between restoring pulses. Thus, the output of amplifier A reasonably reflects the received detector signal within determined parameters due to periodic restoration.

The trailing edge of the 25 millisecond one shot from oscillator 104 passes through differentiator 108 and an inverter 110 to close flip-flop switch 112, thereby providing a gate for a 2 millisecond period square wave from oscillator 114 via AND gate 116 and OR gate 100 to the counter 102. Each count of the counter is converted by a digital to analog converter 115, into a stepped voltage which is summed into the input of restoring amplifier arrangements 66, 66 via line 118 and summing device 64, 64. After six calibration voltage steps occur the seventh count resets flip-flop switch 112 opening the circuit to counter 102 and ending the logic sequence.

It is thus apparent from the diagram illustrated in FIG. 3 and the foregoing description that once each scan period the following is accomplished;

1. A voltage pulse train is generated to facilitate the synchronization of radiometric information obtained during successive scan periods.

2. The radiometer outputs are restored to a known reference voltage level (zero volts) when the radiometer views a known radiation level (space — essentially zero). By doing so, the problem of long term voltage drifts associated with the DC amplifier is circumvented.

3. A voltage calibration signal used to calibrate the gain of the radiometer electronics is generated.

The invention as disclosed is by way of illustration and not limitation and may be modified in many respects all within the spirit and scope thereof.

What is claimed is:

1. In a radiometer arrangement to detect varying levels of electromagnetic radiation, the combination of, detector means operative to create a variable electrical signal in response to varying levels of received radiation;
   means for effectively scanning said detector means over a predetermined path traversing a source of said varying levels of electromagnetic radiation, and
   a source of relatively uniform electromagnetic radiation;
   direct current amplifying means, operatively coupled in series with said detector means, for amplifying said variable electrical signal;
   circuit means, operatively coupled in series with said direct current amplifying means for transmitting the amplified signal to a receiving location;
   means for providing an electrical restoring signal to said direct current amplifying means to periodically restore the effective output of said direct current amplifying means to an approximate base level;
   means for interrupting said circuit means between said amplifying means and said receiving location;
   means for synchronizing the interruption of said circuit means and the providing of said restoring signal to said direct current amplifying means with the scanning by said detector means of said source of uniform electromagnetic radiation; and
   means for providing a notice signal, of determined pattern, to said circuit means prior to the scanning by said detector means of said source of varying levels of electromagnetic radiation.

2. A radiometer arrangement to detect varying levels of electromagnetic radiation according to claim 1,
   wherein said detector means line-scans an orbited planet,
   said planet being said source of varying electromagnetic radiation,
   said detector means scanning dark space to provide a source of relatively uniform level of electromagnetic radiation.

3. A radiometer arrangement to detect varying levels of electromagnetic radiation according to claim 2,
   wherein said means to restore said direct current amplifying means to said base level comprises means to sense drift of said direct current amplifying means and to provide a second input signal to said amplifying means to compensate for the effect of said drift,
   said secondary input signal to said amplifying means occurring during the scan by said detector means of said source of varying electromagnetic radiation.

4. In a detector arrangement to detect varying level of electromagnetic radiation, the combination of,
   a detector to create a variable electrical signal in response to varying levels of received radiation, means to scan said detector over a source of varying level radiation for a determined increment of the total scan motion, means to scan the detector over a source of relatively uniform level electromagnetic radiation during another segment of the total scan motion, direct current amplifying means in series circuit relation with said detector to accomplish amplification of the signal created by the detector as a result of received radiation, said amplifying means normally being subjected to an output drift, and means to restore said amplifying means to an approximate base level comprising means to sense the drift of said DC amplifying means and to provide second input signal to said amplifying means during the scan of the detector over said source of varying level radiation to compensate for the effect of said drift in said amplifying means.

5. A radiometer arrangement to detect varying levels of electromagnetic radiation according to claim 4, wherein the drift of said amplifying means is sensed concurrently with the scan of the detector over said source of relatively uniform electromagnetic radiation.

6. Apparatus for receiving varying energy levels of electromagnetic radiation having wavelengths in the infrared region, said apparatus comprising:

detector means, responsive to said electromagnetic radiation, for providing electrical signals representative of said varying energy levels;

a direct current amplifier having first and second input terminals and an output terminal, said first input terminal being operatively coupled to receive said electrical signals; and feedback loop means, operatively coupled to said direct current amplifier, for compensating for drift voltages associated with said direct current amplifier by applying a restoring signal to said second input terminal.

7. The apparatus defined by claim 6 wherein said feedback loop means includes:

a noninverting amplifier operatively coupled to said output terminal;

a shunt capacitor operatively coupled to said second input terminal; and switching means, responsive to periodic pulsed signals and operatively coupled in series with said noninverting amplifier and to the function of said shunt capacitor and said second input terminal, for periodically rendering said feedback loop means operative.

8. The apparatus defined by claim 6 wherein said detector means is a bolometer arrangement adapted to regularly scan sources of said electromagnetic radiation having varying energy levels.

9. The apparatus defined by claim 6 wherein said direct current amplifier is a differential amplifier.